(12) United States Patent
Rousseau

(10) Patent No.: US 6,921,064 B2
(45) Date of Patent: Jul. 26, 2005

(54) METERING BLADE SUSPENSION SYSTEM

(75) Inventor: Gerard H. Rousseau, Portland, OR (US)

(73) Assignee: Xerox Corporation, Stamford, CT (US)

( * ) Notice: Subject to any disclaimer, the term of this patent is extended or adjusted under 35 U.S.C. 154(b) by 17 days.

(21) Appl. No.: 10/707,573

(22) Filed: Dec. 22, 2003

(65) Prior Publication Data

US 2005/0133975 A1 Jun. 23, 2005

(51) Int. Cl.[7] .......................... F16F 1/18; H03G 15/08; H03G 15/02
(52) U.S. Cl. ...................... 267/36.1; 267/182; 399/174; 399/274; 399/284
(58) Field of Search ............................... 399/274, 284, 399/174; 267/36.1, 182

(56) References Cited

U.S. PATENT DOCUMENTS

| | | | |
|---|---|---|---|
| 3,585,966 A | * | 6/1971 | Hill ............................ 118/262 |
| 4,026,648 A | * | 5/1977 | Takahashi .................... 399/101 |
| 5,717,987 A | * | 2/1998 | Fromm ........................ 399/325 |
| 5,722,022 A | * | 2/1998 | Park ............................ 399/284 |
| 5,805,191 A | | 9/1998 | Jones et al. .................. 347/103 |
| 5,808,645 A | | 9/1998 | Reeves et al. ............... 347/103 |
| 5,937,236 A | * | 8/1999 | Kim ............................ 399/103 |
| 6,068,372 A | | 5/2000 | Rousseau et al. |
| 6,109,174 A | * | 8/2000 | Giard .......................... 101/123 |
| 6,176,575 B1 | | 1/2001 | Crawford et al. ........... 347/103 |
| 6,431,703 B2 | | 8/2002 | Rousseau et al. |

FOREIGN PATENT DOCUMENTS

| | | | | |
|---|---|---|---|---|
| JP | 06202517 A | * | 7/1994 | .......... G03G/15/20 |
| WO | WO 9736747 A1 | * | 10/1997 | ........... B41F/15/44 |

* cited by examiner

Primary Examiner—Xuan Lan Nguyen
(74) Attorney, Agent, or Firm—Oliff & Berridge, PLC

(57) ABSTRACT

A metering blade suspension system utilizes a leaf spring that performs multiple combined functions such as supporting a metering blade assembly, controlling the angle, position and/or load of the blade assembly while allowing the assembly to pivot in a quasi-frictionless motion, locking the blade assembly in place, providing an electrical connection and/or bleeding static charge.

12 Claims, 7 Drawing Sheets

METERING BLADE SUSPENSION SYSTEM

BACKGROUND OF INVENTION

1. Field of Invention

This invention relates to a suspension system for a metering blade.

2. Description of Related Art

It is known to utilize intermediate transfer layers in ink printing systems, such as disclosed in U.S. Pat. Nos. 6,068,372 and 6,431,703, to Rousseau et al. These systems utilize an oiling roller that engages the imaging drum and applies a liquid intermediate transfer layer to the imaging drum. The print head ejects drops of ink onto the liquid intermediate transfer layer to form an ink image thereon. A receiving substrate such as paper is then brought into contact with the intermediate transfer layer on the imaging drum and the ink image is transferred to the receiving substrate.

A part of the solid ink technology printing process includes the drum maintenance unit. One of the drum maintenance unit's objectives is to apply a metered amount of release agent to the imaging drum prior to the print head imaging process. The metering blade meters the oil applied by the oiling roller into a very thin film that will be sufficient to have the ink preferably stick to the media rather than to the drum.

SUMMARY OF THE INVENTION

It is important that ink printing systems apply a desired amount of liquid onto the intermediate transfer layer. The amount of liquid should be consistent and should not vary over time. Insufficient control over the distribution and thickness of the liquid intermediate transfer layer has negative effects on printed image quality. Non-uniform film distribution or improper film thickness around the imaging drum results in undesirable image artifacts. Those areas of the surface that have more fluid may be visible on the image as low gloss spots or streaks. If the intermediate transfer layer becomes too thin or is absent, ink can adhere to the imaging drum and not be transferred to the receiving substrate. It is also important to remove foreign matter from the surface of the imaging drum. Optimum performance is achieved by controlling the position, angle and load of the blade.

This invention is directed to a metering blade suspension system that avoids various disadvantages and drawbacks associated with conventional systems. In various exemplary embodiments a leaf spring suspension system is contemplated.

This invention provides a simpler, more reliable, and easier to assemble design that uses fewer parts.

This invention separately provides a system for controlling the blade angle, position and load of a metering blade.

This invention separately provides reduced rotational friction.

This invention separately provides improved static discharge.

This invention separately provides a more compact blade suspension system.

This invention separately contributes to a reduction in size of a drum maintenance unit.

This invention separately contributes to a reduction in costs of manufacture and maintenance of a drum maintenance unit.

Various exemplary embodiments of this invention provide a metering blade suspension system comprising a metering blade assembly and at least one leaf spring connected to the assembly. The at least one leaf spring may be a pair of leaf springs. Each of the pair of leaf springs may be substantially identical.

In various exemplary embodiments of this invention, the metering blade assembly pivots on the at least one leaf spring.

In various exemplary embodiments of this invention, the at least one leaf spring controls the blade angle, position, and/or load of the metering blade.

In various exemplary embodiments of this invention, the at least one leaf spring is part of an electrical connection to the blade assembly. Further, in various exemplary embodiments, the at least one leaf spring may serve as a grounding path for bleeding static charge in the metering blade assembly. The at least one leaf spring may be made of an electrically conductive material such as, for example, metal.

Various exemplary embodiments of this invention provide a drum maintenance unit (DMU) comprising the metering blade assembly. The DMU may be disposed in a removable cassette. The DMU and or the cassette may be a consumable unit.

BRIEF DESCRIPTION OF THE DRAWINGS

Various exemplary embodiments of the systems and methods of this invention are described in detail below, with reference to the attached drawing figures, in which.

DETAILED DESCRIPTION OF EXEMPLARY EMBODIMENTS

This invention may be applied to various metering blade assembly configurations and is not limited to the particular configurations disclosed by the exemplary embodiments. Those skilled in the art will appreciate a metering blade suspension system in accordance with this invention without including all of the particular features disclosed by the exemplary embodiments.

Figure 1:
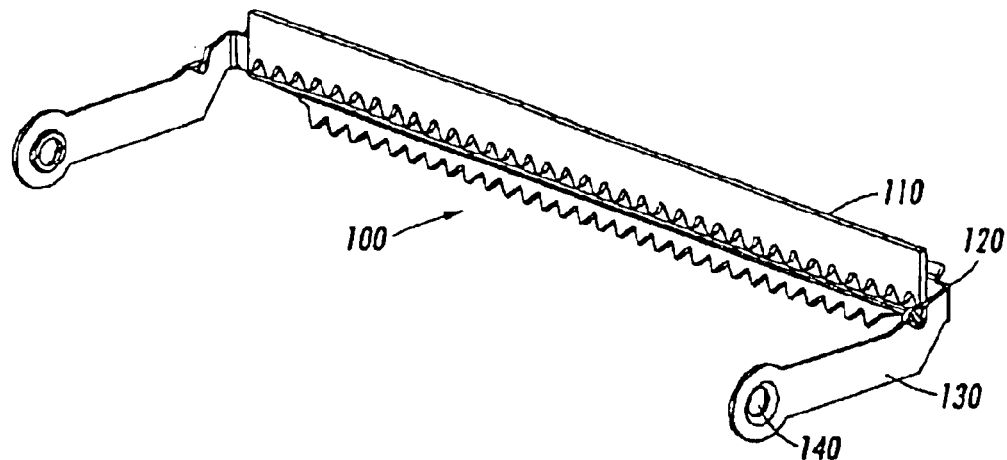
FIG. 1 is a view of a known metering blade, which is part of a suspension system.

FIG. 1 illustrates a conventional metering blade suspension system 100. A metering blade 110 is affixed to an elongated blade mounting bracket 120 that provides both a rigid support and arms 130 for rotation. Two torsion springs apply a load to bias the blade 110 against a drum (not shown). The arms 130 are provided at each end of the mounting bracket 120 and include an aperture 140 to facilitate the attachment of the mounting bracket 120 and to provide an axis of rotation. Typically, the metering blade 110 comprises an elastomeric material. As described above, the metering blade 110 functions to apply a finely metered amount of oil to the transfer drum surface. The blade 110 also functions to capture paper fibers, untransfixed pixels and other debris.

Problems exist with the conventional metering blade system 100. For instance, the arms 130 at each end of the blade mount bracket are at risk of being bent during shipping or handling. This can cause misalignment of the metering blade 110 in the system 100. The conventional system 100 requires multiple steps to assemble and relies on multiple parts to hold the assembly in place. The conventional system 100 requires the attachment of at least two torsion springs that are mirror images of each other. Tensioning and latching the torsion springs present significant assembly steps.

Figure 2:
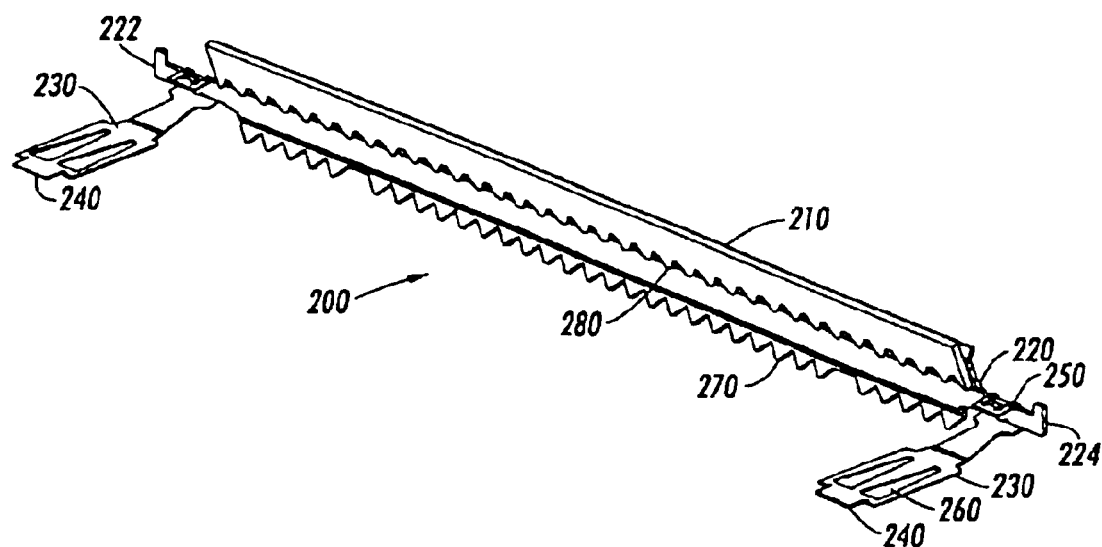
FIG. 2 is a view of an exemplary embodiment of a metering blade suspension system according to this invention.

FIG. 2 illustrates a first exemplary embodiment of a metering blade suspension system 200 according to this invention. A metering blade assembly 290 comprises a metering blade 210 affixed to an elongated blade mounting bracket 220. A leaf spring 230 is attached to each lateral end of the elongated mounting bracket 220. The leaf spring 230 serves as an arm for rotation of the blade 210 and also flexes to provide a load to the blade 210. The leaf spring includes cutout portions 260 that contribute to the degree of flex. One end of the leaf spring 230 is attached to the mounting bracket 220 by a crimping means 250. At the other end opposite to the mounting bracket attachment, the leaf spring 230 includes a tab portion 240 that facilitates attachment of the leaf spring 230 to a drum maintenance unit (not shown). The mounting bracket 220 includes lateral ends 222 and 224.

In the first exemplary embodiment, the metering blade 210 and mounting bracket 220 include multiple downwardly directed drip points 270 and 280 from which excess oil and entrained debris drip. These drip points thus facilitate the efficient filtration and reclamation of the oil.

Figure 3:
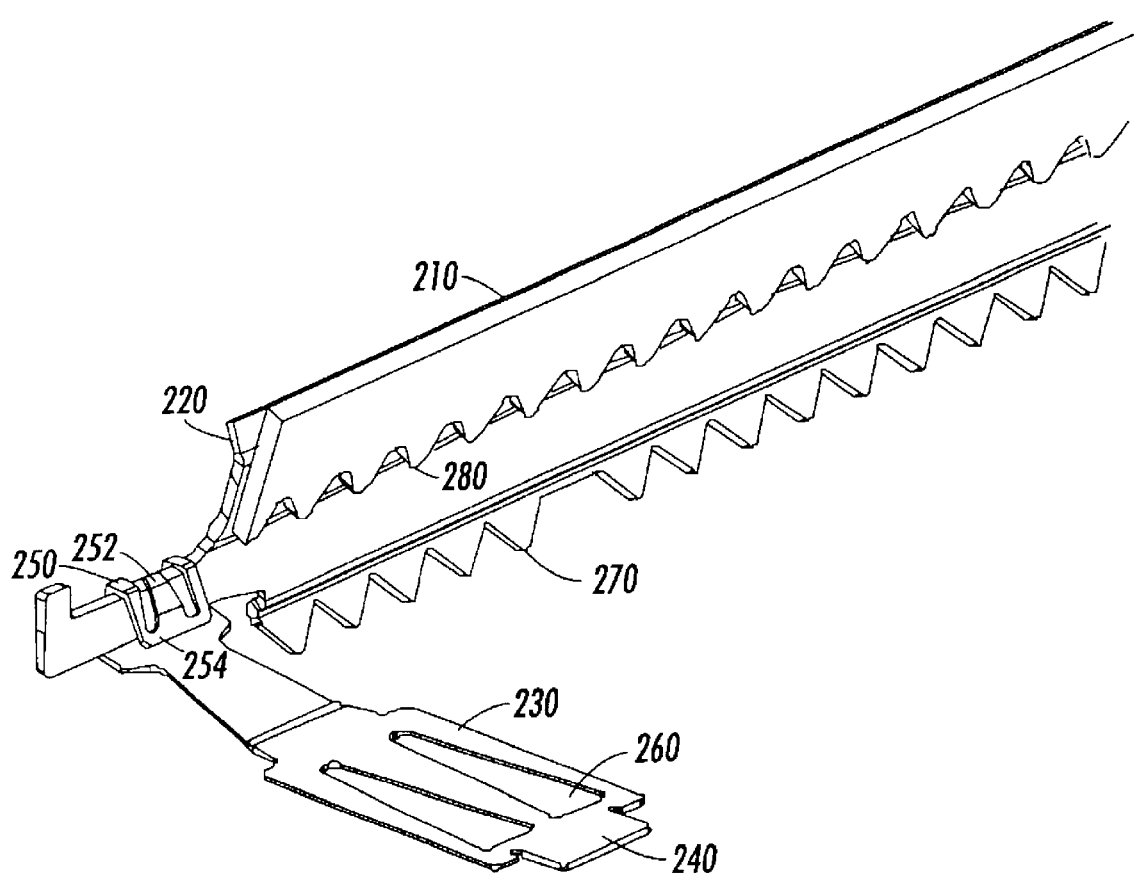
FIGS. 3 and 4 are enlarged partial views of the exemplary embodiment of FIG. 2.
Figure 4:
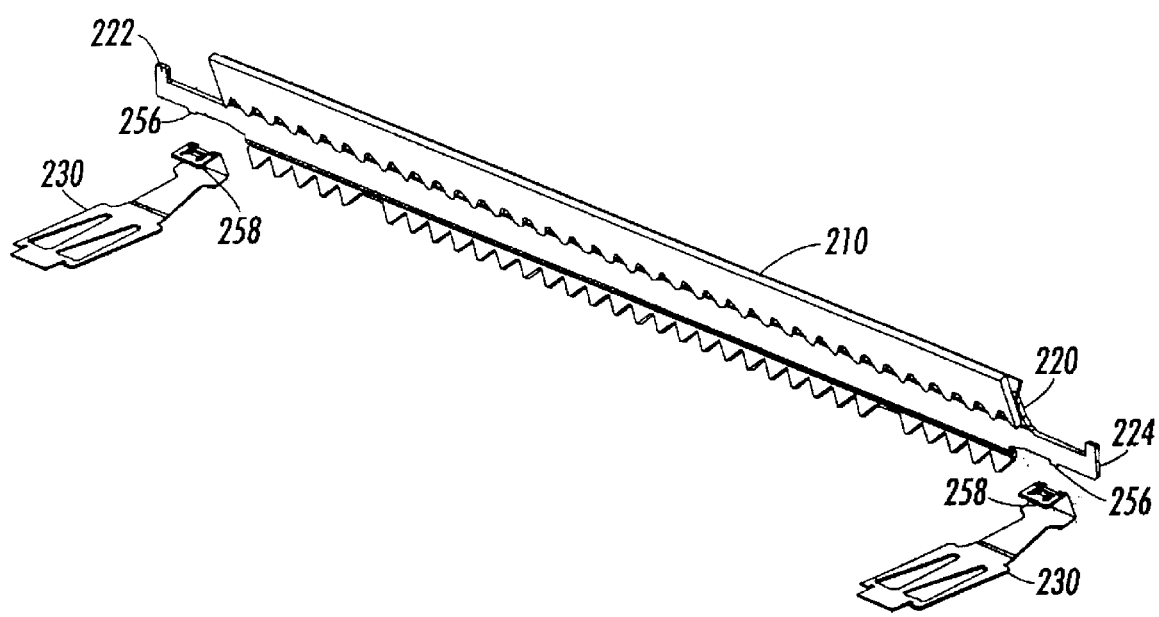

FIGS. 3 and 4 illustrate enlarged views of the first exemplary embodiment of this invention. In FIG. 3, the metering blade 210 may be attached to the mounting bracket 220 by any known or hereafter developed technique, for example by adhesive. One end of the leaf spring 230 is attached to the blade assembly 290. The exemplary attachment involves crimping an overhanging tab portion 250 of the leaf spring. The tab portion 250 is bent over and around the mounting bracket 220. The tab portion 250 is crimped sufficiently so that an end 254 of the tab is directed substantially downward. The tab portion 250 includes a tab 252 that presses against the mounting bracket 220.

In FIG. 4, the leaf spring 230 is shown detached from the blade assembly 290. The mounting bracket 220 includes a tab 256 and the leaf spring 230 includes a slot 258. When the leaf spring 230 is attached to the blade assembly 290, the tab 256 fits into the slot 258. The attachment is not limited to the crimping method shown in FIGS. 3 and 4, however, the attachment should provide sufficient strength to withstand stresses resulting from flexing the leaf springs during use of the metering blade 210.

Figure 5:
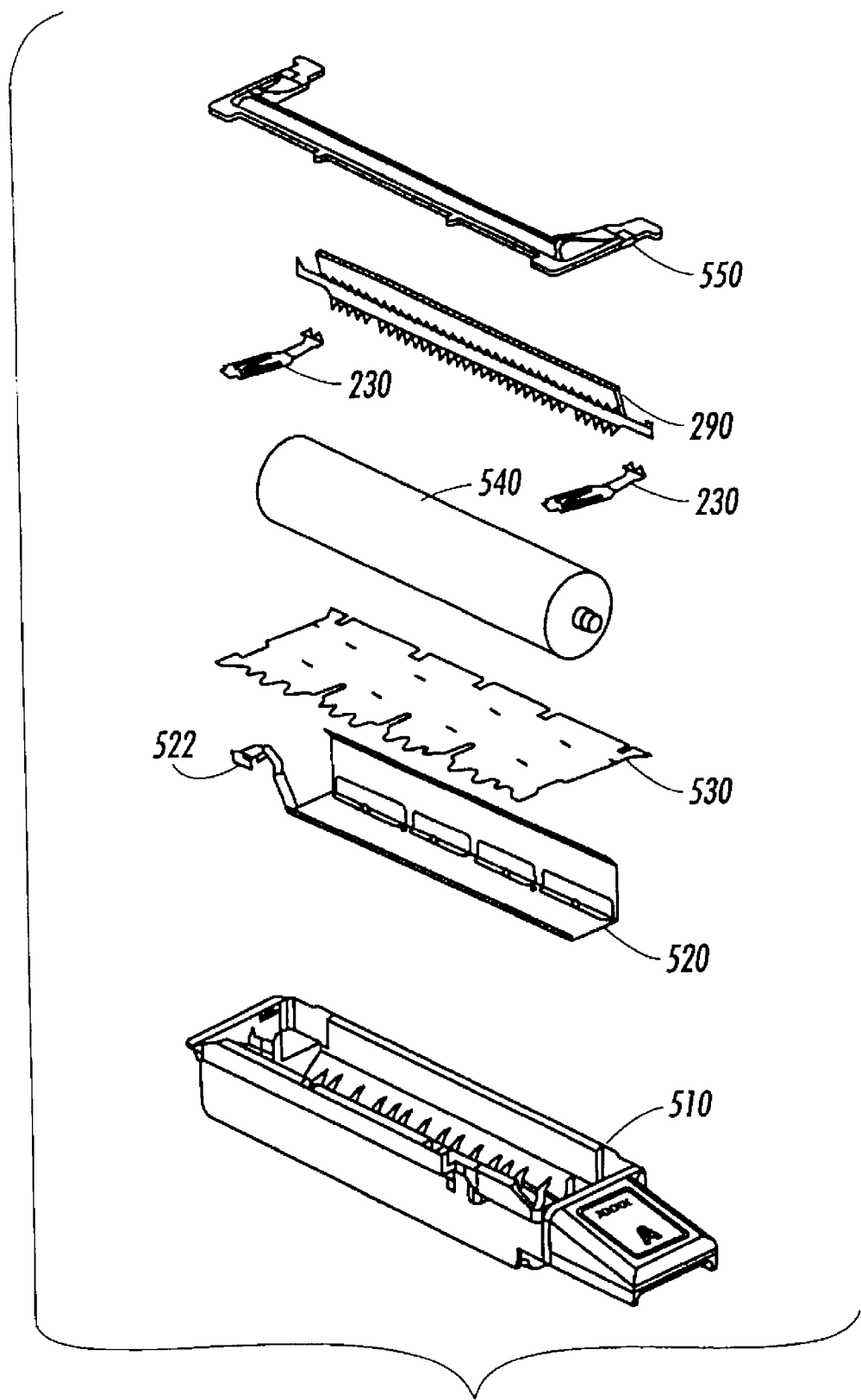
FIG. 5 is an exploded perspective view of a replaceable cassette for an imaging apparatus according to an exemplary embodiment of this invention.

FIG. 5 illustrates an exploded perspective view of a replaceable cassette 510 for an imaging apparatus according to an exemplary embodiment of this invention. Disposed within the replaceable cassette 510 is a static shield 520, a filter 530, an oiling roller 540, a metering blade assembly 290 with leaf springs 230 and a top cover 550. The static shield 520 includes a tab portion 522. Details of the replaceable cassette are discussed in copending U.S. patent applications Ser. Nos. 10/740,461, 10/707,572, 10/707,577 and 10/707,574.

Figure 6:
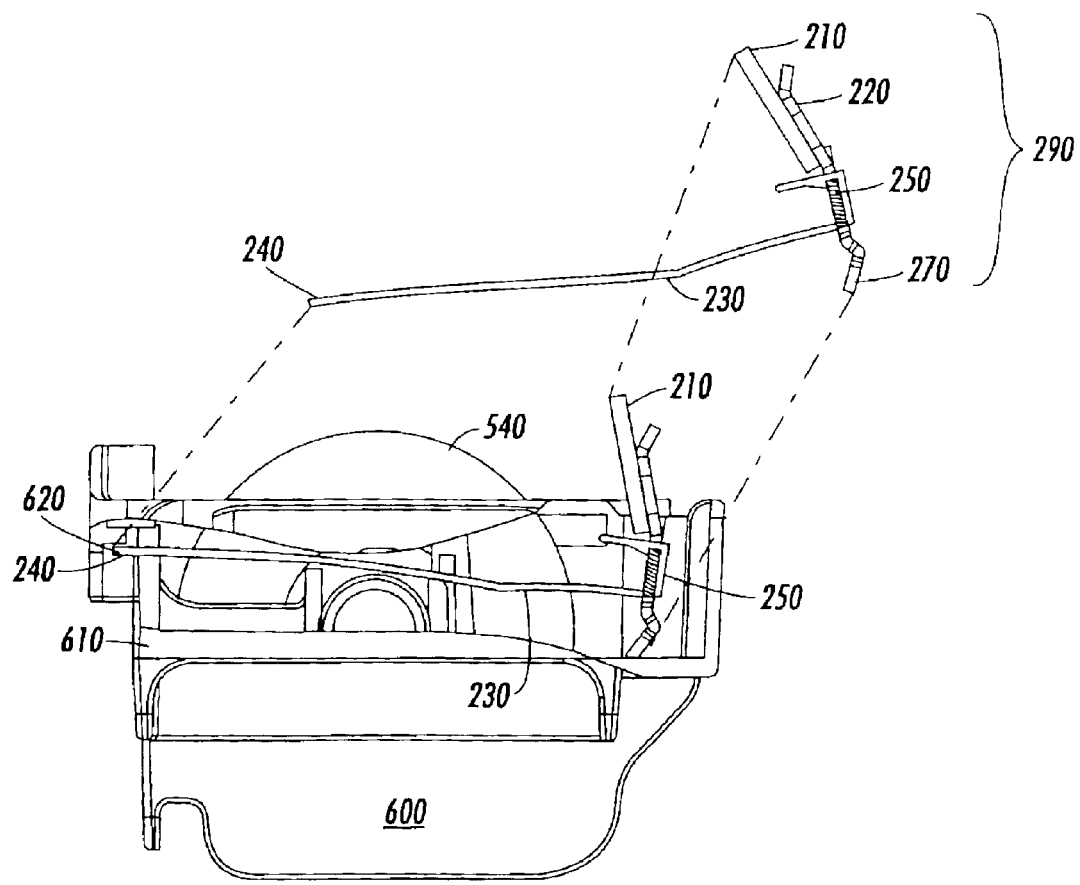
FIGS. 6 and 7 are cross sectional views of an exemplary embodiment of a drum maintenance unit into which an embodiment of a metering blade suspension system according to this invention is installed.
Figure 7:
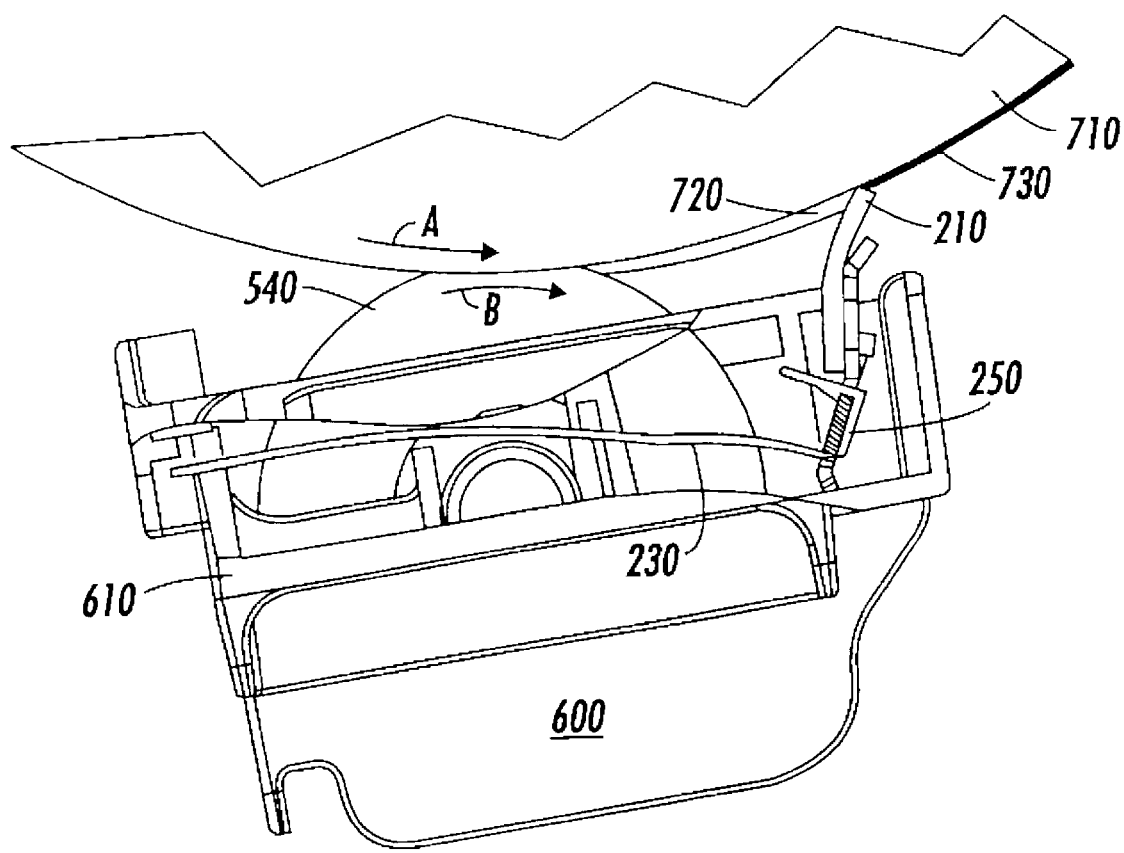

FIGS. 6 and 7 illustrate an exemplary embodiment of how a metering blade suspension system can be assembled as part of a drum maintenance unit 600. In the exemplary embodiment shown in FIG. 6, the leaf spring 230 is first fastened onto the blade mount 220. Then, the blade assembly 290 is dropped into a drum maintenance unit cassette 610. The tab portion 240 of the leaf spring 230 serves as point of attachment for partially locking the assembly 290 in place in the drum maintenance unit 600. The tab portion 240 slips into a receptacle slot 620 located in the drum maintenance unit 600, partially locking the assembly 290 in place. Next, each lateral end 222 and 224 of the blade assembly 290 is further locked into position by the cassette 610, fully locking the assembly 290 in place.

FIG. 7 illustrates an exemplary embodiment of an assembled drum maintenance unit 600 in operation. During operation, the drum maintenance unit 600 is raised so that the oiling roller 540 contacts the surface of the image drum 710. The image drum 710 rotates in the direction of the arrow A. In response, the oiling roller is driven to rotate in the direction of arrow B and applies a release agent 720 to the surface of the image drum 710. The metering blade 210 engages with the 710, downstream from the oiling roller 540. The metering blade 210 distributes a uniform thickness of release agent to consistently form an optimal liquid intermediate transfer layer 730 across the surface of the image drum 710. The oiling roller 540 applies enough release agent to the image drum surface 710 to insure that there is always a sufficient amount of agent available to be metered.

Optimum performance is achieved by controlling the position, angle and load of the blade 210. As the blade 210 meters the release agent, the blade is lifted off the drum surface 710 to allow a metered portion of the agent to flow past the blade. By adjusting the contact force of the blade 210 against the image drum surface 710 and the angle of the blade, the desired amount of blade lift is established. In exemplary embodiments of this invention, the leaf spring 230 applies a vertical load to the blade 210 of about 1–2 pounds per each side of the blade. In various exemplary embodiments of this invention, the angle of the blade 210 at the point of contact with the image drum 710 ranges from about 57 to about 67 degrees as measured between the front face of the blade and a tangent to the drum at the point of contact. In exemplary embodiments of this invention, the leaf spring 230 allows the metering blade assembly 290 to pivot in a quasi-frictionless motion.

In various exemplary embodiments of this invention, the leaf spring 230 comprises an electrical connection. The leaf spring may provide an electrical connection between the metering blade assembly 290 and other parts of the drum maintenance unit for example, by maintaining a point of electrical contact in a relatively stationary area of the spring, such as for example, the tab portion 240. Thus, in various exemplary embodiments of this invention, the tab portion 240 electrically connects with the tab portion 522 of the static shield 520.

Figure 8:
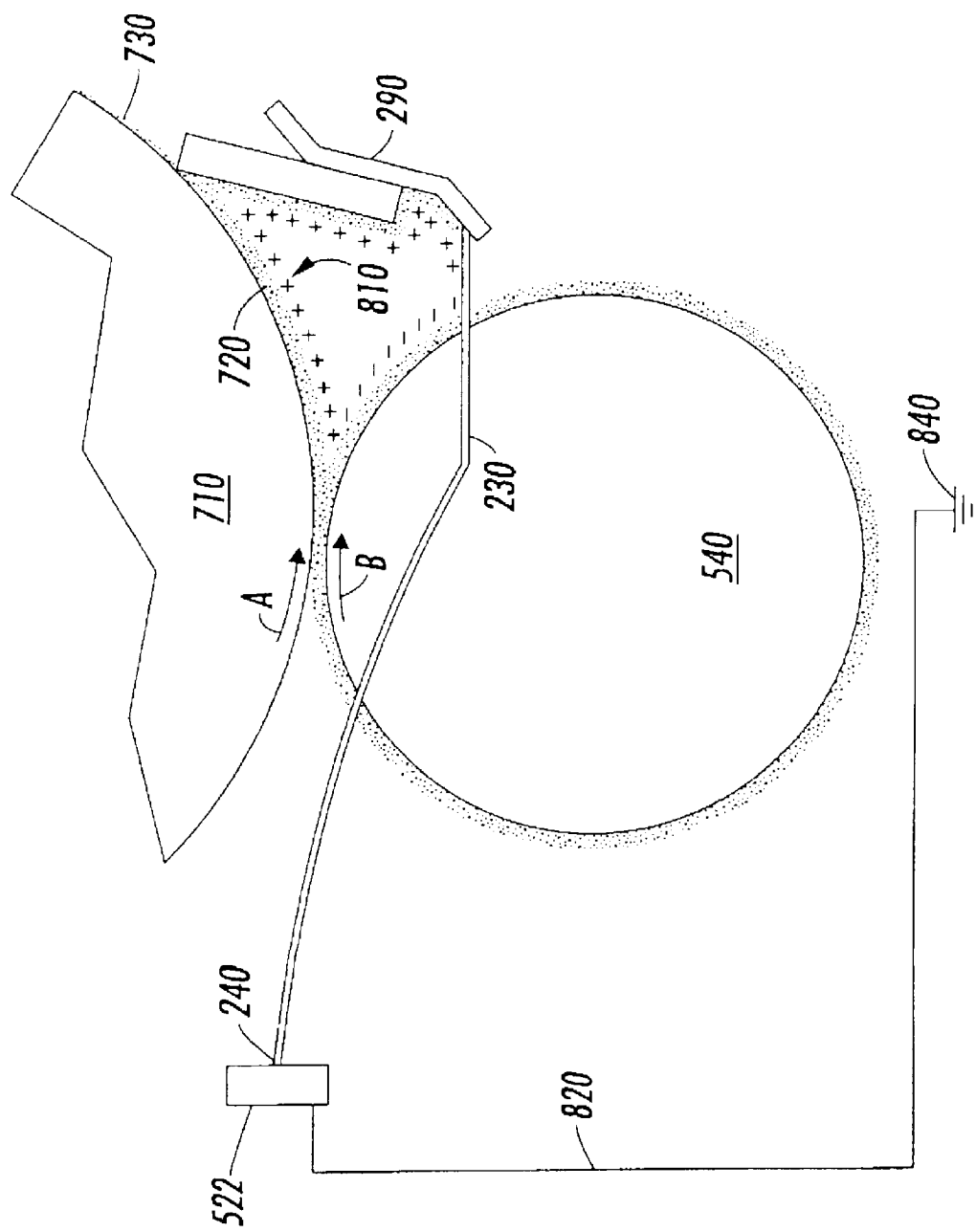
FIG. 8 is a diagrammatic illustration of a blade suspension system engaged with the drum unit and oiling roller with potential electrical charges.

FIG. 8 illustrates an exemplary embodiment of this invention, in which the leaf spring 230 comprises a grounding path for bleeding static charge in the metering blade assembly 290, imaging drum 710 and oiling roller 540. Normal operation of an imaging drum 710 causes the development of an electrostatic field 810. Dispersing the static charge can occur through an electrical contact that includes the leaf spring 230. Thus, in the exemplary embodiment of this invention, the tab portion 240 of the leaf spring 230 and the tab portion 522 of the static shield 520 electrically connect to form a static charge bleeding circuit 820 between the metering blade assembly 290 and a grounding circuit 840, which is located outside of the drum maintenance unit 600. In the exemplary embodiment of this invention, the connection between the tab portion 240 and the tab portion 522 occurs at the receptacle slot 620 of the drum maintenance unit 600 (not shown).

While this invention has been described in conjunction with the exemplary embodiments outlined above, it is evident that many alternatives, modifications and variations will be apparent from a review of the foregoing. Accordingly, the exempary embodiments of the invention, as set forth above, are intended to be illustrative, not limiting. Various changes may be made without departing from the spirit and scope of the invention.

What is claimed is:

1. A metering blade suspension system, comprising:
   a metering blade assembly comprising a metering blade mounted on and supported by a mounting bracket; and
   at least one electrically conductive leaf spring connected by a crimp connection near a first end to a lateral end portion of the mounting bracket adjacent the metering blade assembly and having a second end that secures the metering blade assembly in a drum maintenance unit, wherein the leaf spring controls at least one of an angle, a position and a load of the mounting bracket supporting the metering blade; wherein the at least one electrically conductive leaf spring comprises a grounding path for bleeding static charge from the metering blade assembly; and said system further comprising a static shield provided separate from the meeting blade, the static shield including a tab portion in contact with the at least one electrically conductive leaf spring that forms part of the grounding path for bleeding static charge.

2. The suspension system of claim 1, wherein the leaf spring comprises a support arm for the blade assembly.

3. The suspension system of claim 1, wherein the electrically conductive material comprises metal.

4. The suspension system of claim 1, wherein said at least one leaf spring comprises a pair of leaf springs disposed at opposite end portions of the mounting bracket.

5. The suspension system of claim 1, wherein the metering blade assembly including the mounting bracket pivots on the at least one leaf spring.

6. A drum maintenance unit, comprising the metering blade suspension system of claim 1.

7. The drum maintenance unit of claim 1, wherein the at least one leaf spring secures the blade assembly in the drum maintenance unit.

8. A removable cassette for an imaging apparatus, comprising the drum maintenance unit of claim 1.

9. The suspension system of claim 1, wherein the at least one leaf spring further includes a tab portion for securing the blade assembly in a drum maintenance unit.

10. A method of supporting a metering blade assembly in a drum maintenance unit, comprising connecting by a crimp connection a first end of at least one leaf spring to a mounting bracket on which a metering blade is mounted, and securing a tab portion at a second end of the at least one leaf spring to the drum maintenance unit, wherein the at least one leaf spring controls at least one of an angle, a position and a load of the mounting bracket and the metering blade of the metering blade assembly; wherein the at least one leaf spring comprises a grounding path for bleeding static charge from the metering blade assembly; and said method further comprising connecting a static shield separate from the meeting blade in contact with the at least one leaf spring to form part of the grounding path.

11. The method of claim 10, wherein the at least one leaf spring comprises a pair of leaf springs disposed at opposite ends of the metering blade assembly.

12. The method of claim 10, wherein the mounting bracket and the metering blade assembly pivots on the at least one leaf spring.

* * * * *